United States Patent [19]

Jones

[11] Patent Number: 5,082,754

[45] Date of Patent: Jan. 21, 1992

[54] PRESSURE VESSEL CONSTRUCTION FOR A METAL OXIDE-HYDROGEN BATTERY

[75] Inventor: Kenneth R. Jones, Oconomowoc, Wis.

[73] Assignee: Globe-Union Inc., Milwaukee, Wis.

[21] Appl. No.: 528,876

[22] Filed: May 24, 1990

[51] Int. Cl.$^5$ ............................................ H01M 12/08
[52] U.S. Cl. ...................................... 429/101; 429/48; 429/185; 429/120
[58] Field of Search ............... 429/101, 27, 176, 185, 429/34, 35, 163, 52, 110, 113, 48, 120

[56] References Cited

U.S. PATENT DOCUMENTS

| | | | |
|---|---|---|---|
| 2,914,595 | 11/1959 | Darland, Jr. | |
| 3,850,694 | 11/1974 | Dunlop et al. | 136/86 |
| 3,867,199 | 1/1975 | Dunlop et al. | 136/28 |
| 3,959,018 | 5/1976 | Dunlop et al. | 136/86 |
| 4,098,962 | 7/1978 | Dennison | 429/72 |
| 4,107,395 | 8/1978 | van Ommering | 429/21 |
| 4,112,199 | 9/1978 | Dunlop et al. | 429/29 |
| 4,115,630 | 9/1978 | van Ommering et al. | 429/72 |
| 4,127,703 | 11/1978 | Holleck | 429/57 |
| 4,324,845 | 4/1982 | Stockel | 429/101 |
| 4,467,020 | 8/1984 | Paglisi | 429/101 |
| 4,477,540 | 10/1984 | Miller et al. | 429/27 |
| 4,584,249 | 4/1986 | Smithrick | 429/57 |
| 4,585,711 | 4/1986 | Vaiduanathan | 429/42 |
| 4,683,178 | 7/1987 | Stadnick | 429/101 |
| 4,820,597 | 4/1989 | Lin | 429/50 |
| 4,923,769 | 5/1990 | Jones et al. | 429/101 |
| 4,957,830 | 9/1990 | Jones | 429/101 |

OTHER PUBLICATIONS

Engineering Resource for Advancing Mobility, "SAE Technical Paper Series", 20th IECEC, Aug. 18-23, 1985.

*Primary Examiner*—Anthony Skapars
*Attorney, Agent, or Firm*—Andrus, Sceales, Starke & Sawall

[57] ABSTRACT

An improved pressure vessel for a metal oxide-hydrogen battery which comprises an outer cylindrical shell and a battery cell is disposed centrally within the shell. A pair of sealed containers or tanks are located in the ends of the shell on either side of the cell and each container contains pressurized hydrogen. In a preferred form of the invention, a portion of each container constitutes a head of the vessel. Each container is provided with an opening which provides communication with the interior of the vessel, and a remotely controlled valve acts to open and close the opening. Opening of the valve permits hydrogen gas to contact the cell to generate an electron current in an exterior circuit. During recharging of the cell, hydrogen generated in the cell passes into the containers and is captured therein by closing of the valves, thereby minimizing self-discharge of the battery cell during standby periods.

23 Claims, 1 Drawing Sheet

PRESSURE VESSEL CONSTRUCTION FOR A METAL OXIDE-HYDROGEN BATTERY

BACKGROUND OF THE INVENTION

Metal oxide-hydrogen batteries, such as nickel oxide-hydrogen batteries, have seen use in aerospace applications and can be used in aircraft starting because they are rechargeable and provide a uniform output during the entire discharge cycle.

In the typical nickel oxide-hydrogen battery, the positive electrodes are generally in the form of flat, porous, sintered, nickel plaques impregnated with nickel hydroxide, while the negative electrodes are formed of a fine nickel mesh screen having a catalyst, such as platinum black, bonded to one surface of the screen through a hydrophobic polymeric material. On discharge of the battery, hydrogen gas contained within the vessel diffuses through the electrolyte surrounding the catalyst surfaces of the negative plates and becomes dissociated by the catalyst to the monoatomic form. The monoatomic hydrogen is ionized and combines with hydroxy ions to form water, with an electron being released in the process of forming each hydrogen ion. In addition, hydroxy ions are formed at the positive electrode by the reaction of water with the available oxygen content of the nickel oxide. As a result of these reactions, an electron current is produced in the exterior circuit. On recharging through application of an outside electron source, the reaction is reversed, causing the regeneration of hydrogen gas at the negative electrode and the re-oxidation of the nickel hydroxide at the positive electrode.

Due to the substantial gas pressures that are involved, the nickel oxide-hydrogen battery is contained within an outer pressure vessel. At start up, hydrogen gas is charged or filled into the pressure vessel at pressures as much as 700 psi. After filling, the vessel is sealed. During discharge, as previously noted, hydrogen gas will diffuse into the battery cells, while on recharging, hydrogen gas generated within the cell is discharged outwardly into the vessel.

Nickel oxide-hydrogen batteries have a relatively high rate of self-discharge during standby periods. For example, a typical nickel oxide-hydrogen battery will self-discharge and may lose approximately 15% of its service life in three days. This is compared with a conventional automotive battery which on self-discharge may lose approximately 1.5% of its service life within 30 days. Because of the relatively high self-discharging rates, a nickel oxide-hydrogen battery requires frequent recharging cycles so that the battery is in an operative condition at all times.

In aircraft use, the nickel oxide-hydrogen battery has particular use in restarting the engine when the aircraft is in flight, due to a flame-out or other engine stoppage. In satellite use, the battery is employed for performing certain working functions. Therefore, it is important that the metal oxide-hydrogen battery not be allowed to self-discharge so it can perform these functions at any time.

SUMMARY OF THE INVENTION

The invention is directed to an improved pressure vessel construction for a metal oxide-hydrogen battery, such as a nickel oxide-hydrogen battery. The battery includes an outer generally cylindrical metal shell and a cell is located centrally in the vessel. A pair of sealed containers or tanks, preferably spherical in shape, are disposed in the ends of the shell on either side of the cell. Each container contains hydrogen gas under pressure.

In the preferred form of the invention, a portion of each container constitutes a head of the vessel.

Each container is formed with an opening that provides communication between the interior of the container and the interior of the vessel. Each opening is adapted to be opened and closed by a remotely controlled electric valve, to thereby permit hydrogen gas to flow between the containers and the interior of the vessel.

The containers are initially charged or filled with hydrogen gas which can be at a pressure up to 700 psi. After filling, the fill fitting is sealed off so that the containers are sealed. As the hydrogen is contained in the sealed containers and is not in contact with the battery cell, there will be no self-discharge of the cell during standby periods.

When it is desired to discharge the battery and generate a current in the exterior circuit, the valve is open, enabling the hydrogen gas to diffuse into the cell and thereby generate an electron current.

When the cell is recharged by the application of an exterior current, the hydrogen generated in the cell will pass from the interior of the shell through the open valves into the containers. When the desired hydrogen pressure has been achieved, the valves can then be closed, trapping the hydrogen within the containers. Thus, the hydrogen contained within the containers will not be depleted by self-discharge of the cell during standby periods, and will be fully available for use.

The invention ensures that the battery cell will be in a charged state and no recharging cycles are required during standby periods.

Other objects and advantages will appear during the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
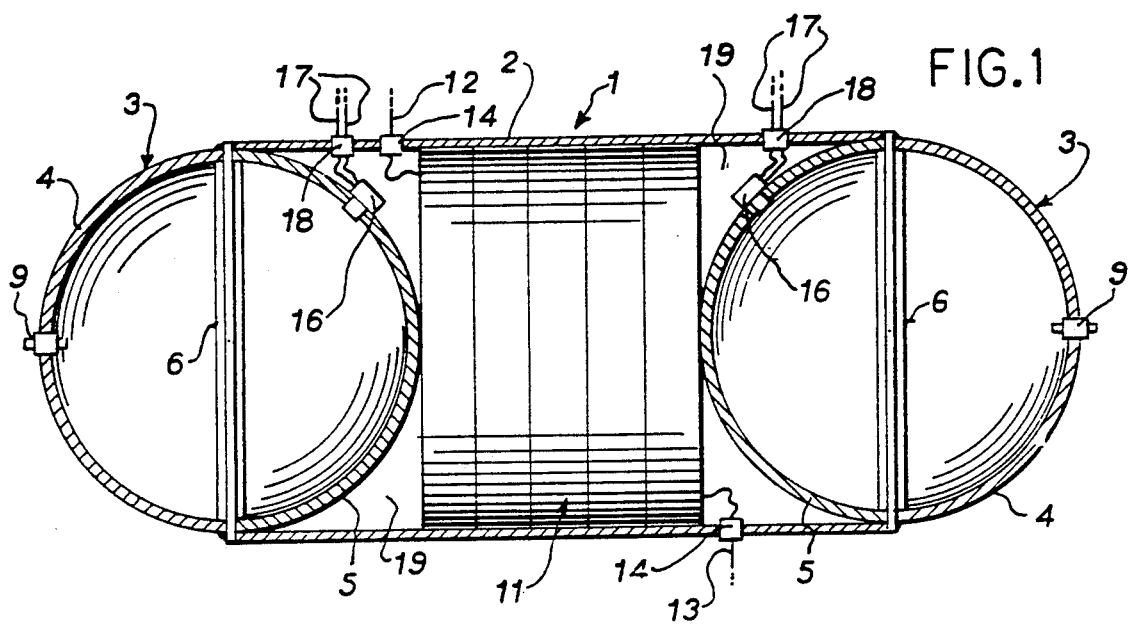
FIG. 1 is a longitudinal section of the battery of the invention.

FIG. 1 illustrates a rechargeable metal oxide-hydrogen battery, such as a nickel oxide-hydrogen battery, that includes an outer pressure vessel 1, preferably formed of metal, that will not embrittle when exposed to hydrogen, such as stainless steel or Inconel.

Vessel 1 includes a generally cylindrical central section or shell 2 and a pair of generally spherical containers or tanks 3 are mounted in the opposed open ends of shell 2. Each container 3 is formed of a pair of semi-spherical sections 4 and 5.

Figure 2:
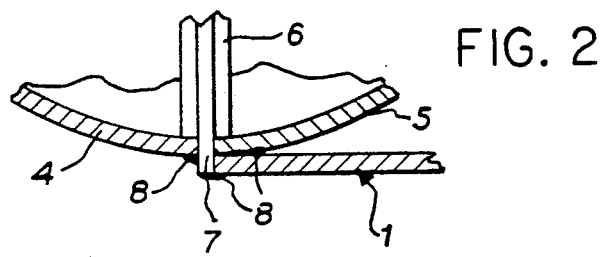
FIG. 2 is an enlarged, fragmentary section showing the connection of the cylindrical shell of the vessel to the spherical container.

FIG. 2 shows the manner of welding the sections 4 and 5 to shell 2. A metal weld ring 6 is located inwardly of the joint between sections 4 and 5 and is provided with an outwardly extending flange 7 that is positioned between the opposed edges of the sections. In addition, the end of shell 2 abuts flange 7. A weld 8 connects the shell 2 to sections 4 and 5, as illustrated in FIG. 2.

As shown in FIG. 1, the containers or tanks 3 preferably have a spherical contour which provides the optimum ability to withstand the high pressures of the hydrogen gas contained within the tanks.

Hydrogen gas is introduced into each of the containers 5 through a fitting 9. After the pressure has reached a predetermined value, up to 700 PSI, the fitting 9 is sealed, thereby providing a sealed container 3 containing the hydrogen gas.

A battery cell 11 is located in the cylindrical shell 2 of vessel 1, between the containers 3. The battery cell 11 can take a form as described in U.S. patent application Ser. No. 07/334,361, filed Apr. 7, 1989 and entitled Rechargeable Metal Oxide-Hydrogen Battery. More specifically, the battery cell comprises two opposed semi-cylindrical stacks or groups of cell modules. Each module is formed of a pair of back-to-back positive electrodes spaced apart by a separating layer, and a negative electrode having a hydrophilic surface is disposed adjacent each positive electrode and separated therefrom by a separator layer. An electrolyte, such as potassium hydroxide solution, is impregnated in the separator layers and is in contact with the positive and negative electrodes.

Positive and negative electrical leads 12 and 13 are connected to opposite ends of the cell 11, and extend through sealed fittings 14 to the exterior.

Each container 5 is provided with an opening 15 which is adapted to be closed by a conventional, electrically operated valve, such as a solenoid valve. The electrical leads 17 connected to valves 16 extend through a sealed fitting 18 to the exterior.

During charging of containers 5 with hydrogen gas, valves 16 are closed so that the hydrogen will not enter the cylindrical shell of the vessel and will not contact cell 11. Thus, there will be no self-discharge of the cell during standby periods.

When it is desired to activate the battery cell 11, one or both valves 16 are opened, enabling the hydrogen to pass into the cylindrical shell 2 of the vessel and contact the cell 11. The hydrogen diffuses through the electrolyte surrounding the catalyst surface of the negative plates and becomes disassociated by the catalyst to the monoatomic form. The monoatomic hydrogen is ionized and combines with hydroxy ions to form water with an electron being released in the process of forming each hydrogen ion. Hydroxy ions are also formed at the positive electrode by the reaction of water with the available oxygen content of the nickel oxide. Because of these reactions, an electron current is produced in the exterior circuit.

On recharging of the battery, hydrogen is generated at the negative electrode and re-oxidation of the nickel hydroxide occurs at the positive electrode. With valves 16 being open during the recharging, the hydrogen gas will pass through the open valves into the containers 3, as well as filling the spaces 19 in the shell 2 between the ends of cell 11 and the respective containers 5. When the desired hydrogen pressure has been obtained in containers 3, valves 16 can be closed, thereby capturing the hydrogen in the containers.

After recharging, a small amount of self-discharge can occur because of the hydrogen located in the spaces 19. But as the volume of spaces 19 is very minor compared to volume of containers 3, the self-discharge will be minimal.

To activate the battery after recharging, the valves 16 are opened, enabling the hydrogen within the containers to contact the cell 11.

Figure 3:
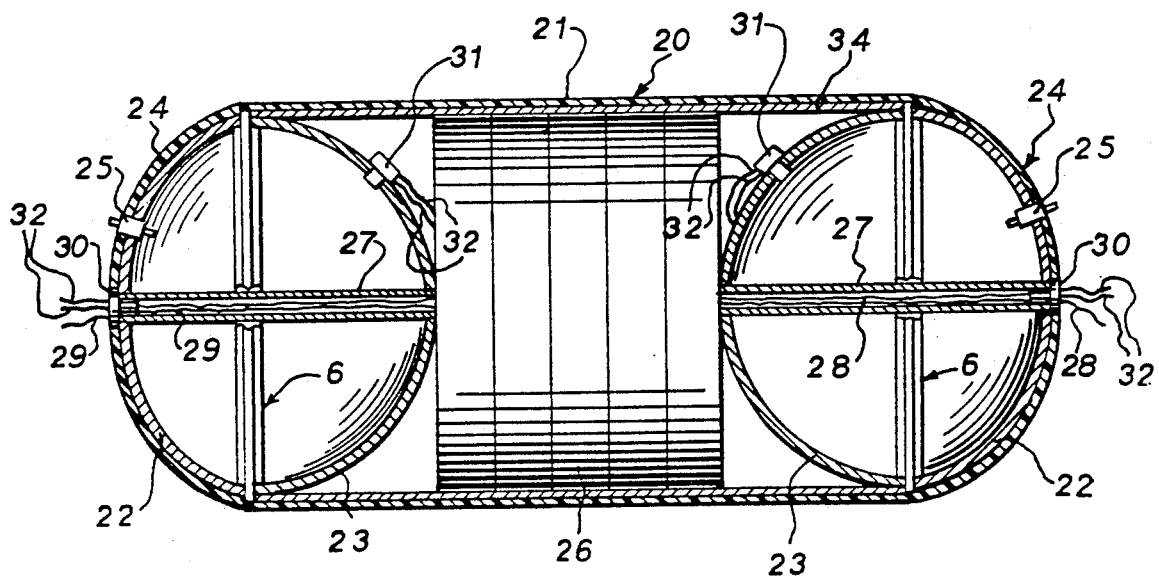
FIG. 3 is a longitudinal section of a modified form of the battery of the invention.

FIG. 3 illustrates a modified form of the battery of the invention which includes an outer vessel 20 composed of a central metal cylindrical section or shell 21, and a pair of generally elliptical metal heads 22 which enclose the ends of shell 21.

Semi-spherical sections 23, similar to sections 5 of the first embodiment, are welded to the ends of shell 21 and to the mating edges of heads 22 in the same manner as described in connection with the first embodiment, thus providing a pair of sealed containers or tanks 24 at each end of the vessel.

As described with respect to the first embodiment, hydrogen gas can be charged into the containers 24 through fittings 25, which are subsequently sealed. A battery cell 26, similar in structure to cell 11, is located in the vessel between the containers 24.

As shown in FIG. 3, a tube 27 extends through each of the containers 24 and is preferably located axially of vessel 20. The inner end of each tube communicates with the central shell 21, while the outer end of each tube 27 is mounted within an opening in the respective head 22. Electrical leads 28 and 29 connected to opposite ends of the battery cell 26 extend through the respective tubes 27 and are sealed within the outer end of the tube by a seal 30.

As in the case of the first embodiment, each container 24 is provided with an opening which is adapted to be opened and closed by a remotely controlled electric valve 31. Electrical leads 32 connected to each valve 31 can extend through the tube 27 to the exterior.

With the construction shown in FIG. 3, an outer layer 34 of resin impregnated fibrous material is wound over the outer surface of the vessel to provide added hoop strength. The layer 34 can be composed of substantially continuous fibers or filaments formed of a material, such as glass or graphite, and impregnated with a thermosetting resin which can take the form of an epoxy or polyester resin.

With the invention, the hydrogen gas is contained within one or more sealed containers or tanks within the vessel, and during standby periods, is not available for self-discharge of the battery cells. Thus, the invention maintains the battery in a charged condition and eliminates the necessity of frequent recharging cycles during standby periods.

While the drawings have illustrated the containers 3 and 24 being formed of metal and constituting the heads of the vessel, it is contemplated that the hydrogen-containing containers can take other forms, such as one or more flexible bags disposed in the vessel or containers can be defined by a portion of the vessel wall and a diaphragm extending across the wall. Further, the hydrogen-containing tank can surround the battery cell.

Various modes of carrying out the invention are contemplated as being within the scope of the following claims particularly pointing out and distinctly claiming the subject matter which is regarded as the invention.

We claim:

1. A metal oxide-hydrogen battery comprising an outer vessel, a battery cell disposed in the vessel, a sealed container and containing hydrogen gas, conduit means providing communication between the interior of the container and the interior of the vessel, and valve means in said conduit means for controlling the flow of hydrogen gas between the container and the vessel.

2. The battery of claim 1 wherein, said container is generally spherical in shape.

3. The battery of claim 1 wherein, said battery cell is disposed centrally of the axial length of said vessel and said battery includes a pair of sealed containers disposed in the vessel and straddling said cell.

4. The battery of claim 3, wherein each of said containers is generally spherical in shape.

5. The battery of claim 1, wherein said container is disposed in said vessel and said vessel includes a dome-shaped head, said head defining a portion of said container.

6. The battery of claim 5, wherein said head is semi-spherical in shape and said container includes a semi-spherical section joined to said semi-spherical head to provide a spherical container.

7. The battery of claim 5, wherein said head is generally elliptical in shape and said container includes a semi-spherical section joined to a peripheral edge of said elliptical head to provide said container.

8. The battery of claim 1, wherein said vessel and said container are formed of metal.

9. The battery of claim 7, and including a layer of resin-impregnated fibrous material disposed on the outer surface of said vessel.

10. A metal oxide - hydrogen battery, a pair of sealed, spaced hollow members each containing pressurized hydrogen gas, a generally cylindrical section connecting said hollow members, a battery cell disposed in said cylindrical section, each hollow member having an opening providing communication between the interior of the hollow member and the cylindrical section, and valve means for opening and closing each opening whereby hydrogen gas can flow between the hollow members and said cylindrical section.

11. The battery of claim 10, and including conduit means for introducing hydrogen gas into each hollow member.

12. The battery of claim 10, wherein said hollow members are spherical in shape.

13. The battery of claim 10, wherein each hollow member includes semi-spherical section and a semi-elliptical section joined together along mating edges.

14. The battery of claim 10, and including electrical conducting means connected to each valve means and extending through an aperture in said cylindrical section to the exterior.

15. The battery of claim 14, and including sealing means for sealing said electrical conducting means within said aperture.

16. The battery of claim 13, and including a layer of resin-impregnated fibrous material disposed around the outer surface of said semi-elliptical sections and around the outer surface of said cylindrical section.

17. A metal oxide nickel battery, comprising an outer vessel, a battery cell disposed centrally in said vessel, a pair of generally spherical sealed containers disposed in the vessel and straddling said cell, each container containing pressurized hydrogen gas, each container having an opening providing communication between the interior of the respective container and the interior of the vessel, and electrically controlled valve means associated with each opening for opening and closing said opening, opening of said valve means permitting hydrogen gas to flow from said containers to said vessel and into contact with said cell and on recharging of said cell, opening of said valve means permitting hydrogen gas generated in said cell to enter said containers.

18. The battery of claim 17, wherein each container comprises a pair of semi-spherical sections joined together along abutting annular edges, one of said sections of each container comprising a head of said vessel.

19. The battery of claim 17, and including electrical connecting means connected to each valve means and extending outwardly in sealed relation through an aperture in said vessel.

20. The battery of claim 10, and including a tubular member extending through at least one of said hollow members and providing communication between the interior of said cylindrical section and the exterior, and electrical connecting means connected to said cell and extending through said tubular member.

21. The battery of claim 20, and including sealing means for sealing said electrical connecting means within said tubular member.

22. The battery of claim 20 and including a tubular member extending through each of said hollow members and said battery includes a pair of electrical connecting means connected to said cell with each electrical conducting means extending through one of said tubular members to the exterior.

23. The battery of claim 22, wherein said tubular members extend axially of said cylindrical section.

* * * * *